Figure 1:
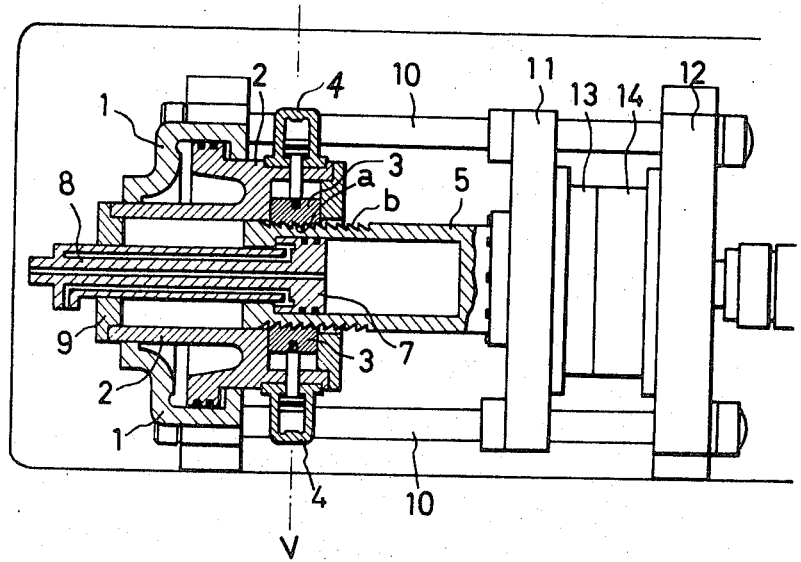

United States Patent

Aoki

[15] 3,656,877
[45] Apr. 18, 1972

[54] MOLD CLAMPING DEVICE FOR INJECTION MOLDING MACHINE

[72] Inventor: Katashi Aoki, 6037 Oaza Minamijo, Sakaki-machi, Japan

[22] Filed: Feb. 27, 1970

[21] Appl. No.: 14,993

[30] Foreign Application Priority Data

Feb. 28, 1969 Japan..............................44/15174
Mar. 14, 1969 Japan..............................44/19277

[52] U.S. Cl..............................425/150, 74/527, 425/242
[51] Int. Cl. .....................................................B29f 1/00
[58] Field of Search......................18/30 LA, 30 LV; 74/527

[56] References Cited

UNITED STATES PATENTS 3,465,387  9/1969  Allard et al...........................18/30 LV
3,505,708  4/1970  Moslo...............................18/30 LV X Primary Examiner—J. Howard Flint, Jr.
Attorney—David H. Semmes

[57] ABSTRACT

A mold clamping device for injection molding machines, in which a quick feed or closure ram is inserted in a mold clamping ram, and when a pair of molds is closed, said feed ram is pushed out from said clamping ram and said two rams are connected by means of a set of half nuts and a screw thread on the periphery of said feed ram engaging with each other, to attain a quick closure and tight clamping of the molds.

2 Claims, 8 Drawing Figures

MOLD CLAMPING DEVICE FOR INJECTION MOLDING MACHINE

The present invention relates to a direct-pressure type mold clamping device for synthetic resin molding machines. In the prior art, direct-pressure type mold clamping devices comprise a movable plate to which one of two molds is attached and a mold clamping cylinder, two being united in a body, wherein said mold clamping cylinder supported by an end housing and tie bars is moved to open and close the molds and effectuated strong mold clamping, the mold clamping cylinder is longer than that used in mold clamping devices of other construction because the same cylinder is used for mold closing and mold clamping. For this reason, large molding machines requiring a long stroke and great mold clamping force must be provided with a huge mold clamping cylinder and an immense quantity of hydraulic oil with which the cylinder is filled. A long time is required for raising oil pressure inside the cylinder to the maximum value because of the immense quantity of hydraulic oil and the hugeness of the cylinder. A large high-pressure pump is necessary for reducing the time. Moreover, as the movable plate travels over a fixed distance, an increase in the thickness of a metal mold means a decrease in the stroke of the movable plate as much. This fact proves to be disadvantageous to the molding of large products. The reason is that, when large products are to be molded, metal molds will naturally increase in thickness, while a long stroke will be required for taking out molded products from molds. A direct-pressure type mold clamping device, in which a power loss is small when oil pressure for mold clamping force is raised and the movable plate will not decrease in stroke when a mold increases in thickness, has been developed. This mold clamping device is provided with a mold clamping cylinder between a mold closing cylinder and a movable plate, the mold closing cylinder adapted to open and close the movable plate in a free stroke and the mold clamping cylinder united with the movable plate adapted to develop the maximum clamping force. Pressure applied to the mold closing cylinder is born by an end housing through the medium of upper and lower locking means provided on a mold thickness adjusting barrel. Said locking means, each composed of a hydraulic cylinder and a semicircular locking plate, are put in a locking condition by the locking plates which are put in action by the hydraulic cylinders which function when molds are closed, thereby uniting the mold closing cylinder and the mold thickness adjusting barrel in a body to resist pressure.

Such a key lock type is advantageous in that, as the mold clamping cylinder is short in stroke, oil to be compressed is small in quantity, mold clamping pressure rises quickly and a high-pressure pump of large capacity need not be used, while it is defective in that it is hardly employed in small molding machines because of complicated construction of the key lock and the need of a mold thickness adjusting means for varying the position of the key lock with every change in mold thickness.

An object of this invention is to provide a mold clamping device simple in construction and easy to manufacture and operate.

Another object of this invention is to provide a mold clamping device capable of positive adjustment of the engagement of a screw on a lock member for joining a mold clamping ram and a quick feed ram (mold closing cylinder) in a body with a screw engaged therewith without the use of a special adjusting means.

A further object of this invention is to provide a mold clamping device wherein a lock member for joining a mold clamping ram and a quick feed ram in a body is made in the form of a pair of half-nuts, capable of starting both processes of high-speed mold opening and strong mold clamping.

A still further object of this invention is to provide a mold clamping device for starting high-speed mold opening when half-nuts are separated completely from a quick feed ram and, on the other hand, for starting mold clamping when the half-nuts come in complete contact with the quick feed ram to bring about the engagement in a normal state, thus uniting the mold clamping ram and the quick feed ram virtually in a body.

Figure 2:
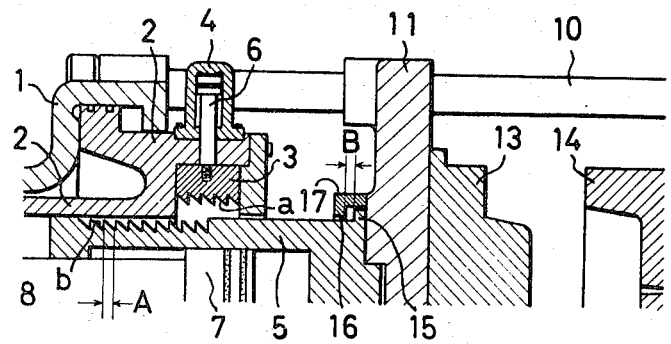
Figure 3:
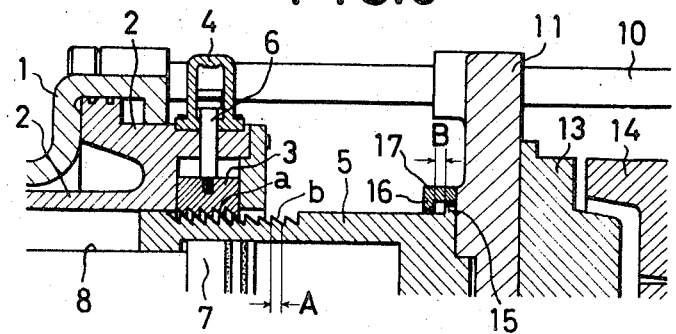
Figure 4:
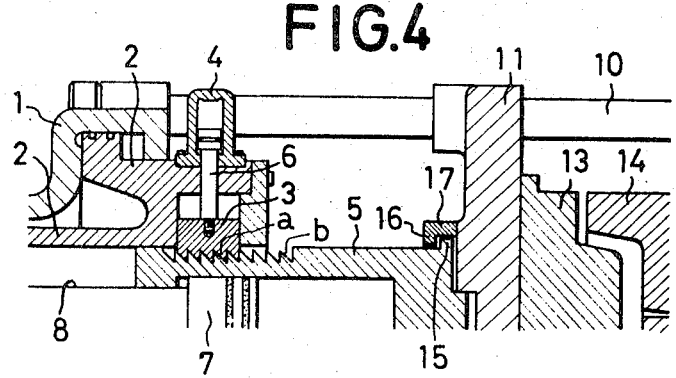
Figure 5:
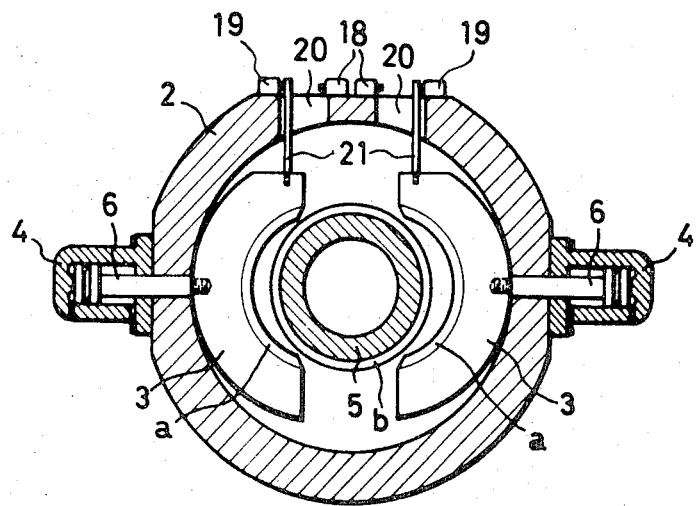
Figure 6:
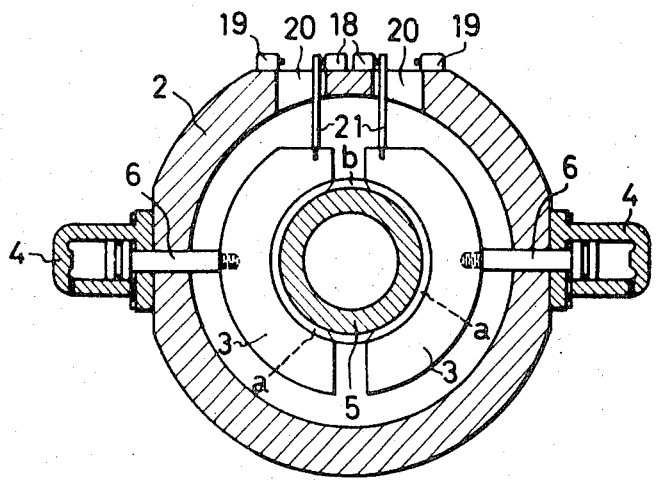
Figure 7:
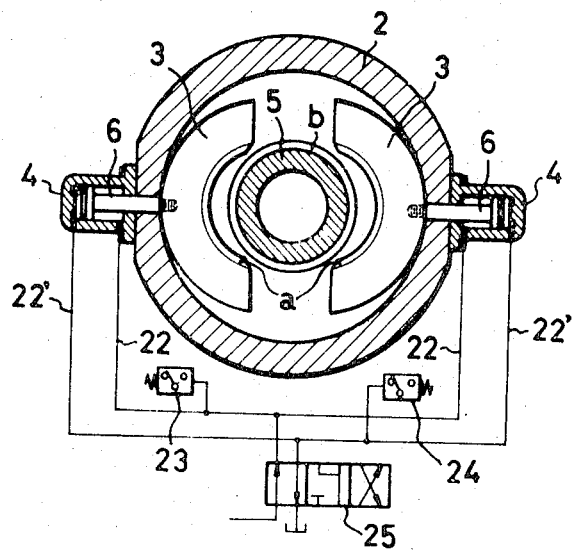
Figure 8:
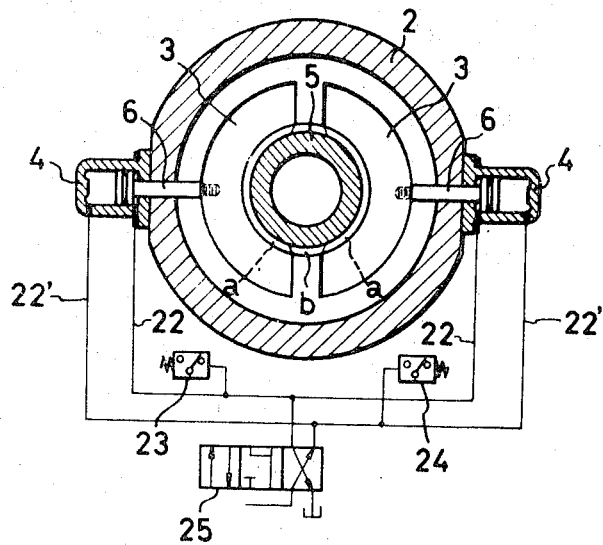

Detailed description of this invention will be given with reference to embodiments shown in the accompanying drawings, in which:

FIG. 1 is a partial sectional plan view of the mold clamping device embodying this invention;

FIGS. 2, 3 and 4 are enlarged sectional plan views showing the engagement of the tooth profile of the half-nuts for locking with that on the circumferential surface of the mold closing cylinder; and FIGS. 5 to 8 are sectional elevations taken on the line V—V of FIG. 1, wherein FIGS. 5 and 6 show high-speed mold opening and strong mold clamping with half-nuts and microswitches and FIGS. 7 and 8 show two similar conditions in accordance with another embodiment.

In the drawings, 1 is a mold clamping cylinder, 2 is a mold clamping ram mounted in the mold clamping cylinder 1. The mold clamping ram 2 is provided with a pair of half-nuts 3 opposed to each other at the front end thereof, a pair of the half-nuts 3 being moved to open and close by rods 6 in hydraulic cylinders 4. 5 is a cylindrical quick feed ram, having a screw thread (b) engaged with the screw threads a on said half-nuts 3 carved on the circumferential surface thereof and a quick feed piston 7 held inside thereof. The rod 8 of the quick feed piston 7 has the end thereof connected to a disc 9 fixed at the rear end of the mold clamping ram 2.

The fore end of the quick feed ram 5 is connected to a movable plate 11 supported by a plurality of tie-bars 10 to have a pair of molds 13, 14 disposed between the movable plate 11 and a fixed plate 12 opened and closed or clamped by the forward and backward movement of the quick feed ram 5.

In the mold clamping device of the above-mentioned composition, the mold clamping ram 2 and the quick feed ram 5 are connected to each other by the engagement of the screws a on the half-nuts 3 with the screw b on the quick feed ram 5 and pressure is applied to the mold clamping ram 2 to clamp the molds, making it necessary for the quick feed ram 5 to be in the position where the two screws a, b are engaged securely with each other. If the two screws a, b are not in perfect engagement with each other when high-speed mold closing is completed and the half-nuts 3 are pressed against the screw on the quick feed ram 5, the quick feed ram 5 will be pulled back toward the mold clamping ram 2 by a component force on the slanting surface of the screw and the weight of the quick feed ram and the weight of the movable plate 11 and the mold 13 connected thereto act on the tooth face of the screw b, giving rise to such troubles as wear and biting of the tooth face.

In the afore-mentioned prior device, an adjusting means is attached to the quick feed ram 5 to adjust the position of the quick feed ram 5 according to the thickness of the molds 13, 14 after they are closed. However, as a deviation of the two screws a, b from each other arising from the position of the quick feed ram 5 is attributed to the tooth pitch A (see FIG. 2 and 3) irrespective of the thickness of the molds 13, 14, it is hard to adjust the position of the quick feed ram for perfect engagement because the amount of adjustment is slight.

In accordance with this invention, it is possible to obtain secure engagement between the two screws a, b without the use of a special adjusting means, and also possible to adjust the position of the quick feed ram 5 automatically when the two screws a, b are engaged with each other irrespective of the thickness of the molds 13, 14. That is to say, a flange 15 is formed in a body with the quick feed ram 5 at the connecting end thereof and a connecting ring 17 having a rim 16 which forms a gap B nearly equal to the tooth thickness A of the screw with the flange 15 is attached to the movable plate 11 on the back and at the center thereof, thus connecting the quick feed ram 5 separately and movably through the connecting ring 17.

In accordance with this invention of the above-mentioned construction even if the quick feed ram 5 comes somewhat out of position after the molds are closed according to the thickness of the molds 13, 14, resulting in imperfect engagement of the screw a on the half-nut 3 with the screw b on the quick feed ram as shown in FIG. 3, it is possible to move the quick feed ram 5 automatically and separately by pressure applied to the half-nut 3 and a component force on the slanting surface of the screw to bring the screws a, b in perfect engagement as shown in FIG. 4. Therefore, unlike the case where the quick feed ram is fixed to the movable plate, the half-nuts and the quick feed ram are always connected to each other under normal engagement after the molds are closed irrespective of the thickness of the molds and the weight of the quick feed ram only acts on the tooth surfaces of the screws engaged with each other, thus reducing such troubles as wear and biting on the tooth surfaces and eliminating the need of adjustment each time molds are changed.

Strong mold clamping in the above-mentioned mold clamping device must be started after the crest of the screw a comes positively into the root of the screw b, producing connection under perfect engagement. If strong mold clamping is started in such a state of imperfect connection as loose and shallow engagement, the crests of the two screws a, b are subjected to pressure and may even be bitten away in the worst case, giving rise to an unexpected accident. In high speed mold opening, on the other hand, the quick feed ram 5 must be returned rapidly after the half-nuts 3 are separated completely from the quick feed ram 5, disconnecting the quick feed ram from the mold clamping ram. If high speed mold opening is started before the half-nuts 3 are separated completely, the quick feed ram 5 is prevented from returning by the half-nuts 3 in a state of engagement, and if it is forced to return, the crests of the two screws a, b will be broken.

It is formed in the mind that the quick feed ram 5 or the mold clamping ram 2 will be provided with a starting means, which will be actuated by the movement of said ram to to clamp or open the molds, thereby preventing the aforementioned troubles from arising.

Since the movement of each of the aforementioned rams is utilized for starting mold clamping or mold opening according to the above-mentioned method, however, the next process is started upon movement of each ram to a predetermined position irrespective of the condition of the engagement of the half-nuts 3. The next process may be started while the screws are in imperfect engagement or before they are completely moved back, giving rise to troubles as mentioned above.

In accordance with this invention, a plurality of mold clamping switches and mold clamping switches are provided opposedly to each other on the mold clamping ram to start strong mold clamping and high speed mold opening alternately by the movement of these switches and the above-mentioned half-nuts, or pressure switches for effecting mold clamping and mold opening alternately are provided in hydraulic circuits for moving the half-nuts forward and backward to start strong mold clamping and high speed mold opening alternately by a rise of pressure in the hydraulic circuits coming about when said half-nuts come to a stop.

In an embodiment shown in FIG. 5 and 6 in which strong mold clamping and high speed mold opening are effectuated by the movement of a pair of half-nuts 3, a plurality of strong mold clamping switches 18 and high speed mold opening switches 19 are provided on the upper part of a mold clamping ram 2 having holes 20 made therein, each set of two switches 18, 19 being disposed opposedly to each other on each side of said holes 20 and rods 21 for actuating each of the above-mentioned sets of switches 18, 19 are provided uprightly on the upper end of a pair of the half-nuts 3. The half-nuts 3 are moved toward and away from a quick feed ram 5 with the medium of the rods 6 by oil pressure in hydraulic cylinders 4 fixed to the mold clamping ram 2 and when the half-nuts 3 come in contact with predetermined positions, the above-mentioned rods 21 will press either of the switches 18, 19 to start strong mold clamping and high speed mold opening.

FIG. 5 shows the case wherein a pair of the half-nuts 3 are moved backward to the mold clamping ram 2 by hydraulic pressure, thus disconnecting the mold clamping ram 2 and the quick feed ram 5 completely from each other to enable the quick feed ram 5 to operate separately, the actuating rods 21 provided on the half-nuts 3 pressing the switches 19 lying in the direction of movement by the backward movement of the half-nuts 3 to start high speed mold opening by means of the aforementioned quick feedpiston 7, the quick feed ram 5 being moved inward of the mold clamping ram to open the molds 13, 14.

FIG. 6 shows the case wherein a pair of half-nuts 3 are pushed toward the part at the rear end and on the circumference of the quick feed ram 5 which has been returned by another means, that is, toward the part thereof whereon a screw b is provided to connect the mold clamping ram 2 and the quick feed ram 5 in a body by the engagement of screws a, b with each other, the actuating rods 21 pressing the switches 18 inversely to the above-mentioned to operate the mold clamping ram 2 to press the quick feed ram 5 united therewith in a body toward the molds.

In this case, if the screw b on the quick feed ram 5 and the screw a on the half nut 3 get somewhat out of position for some reason or other, keeping the screws a, b from coming into normal engagement and the quick feed ram 5 and the half-nuts 3 are connected completely under the condition that the crests of the two screws butt to each other, the actuating rods 21 provided previously for actuating the switches only when normal engagement comes about are prevented from pressing the switches 18 completely by some gap formed, making it impossible to effect strong mold clamping subsequently to the connection of the rams, whereby damage of the screws a, b attributed to imperfect engagement is prevented automatically.

FIG. 7 and 8 show an embodiment in which pressure switches 23, 24 for strong mold clamping and high speed mold opening are provided in hydraulic circuits 22, 22' to make use of a rise of pressure coming about when the half-nuts 3 are pressed against predetermined positions or come to a stop. In FIG. 7, when hydraulic cylinders 4 are put in action by the driving of a hydraulic device 25 to open a pair of half-nuts 3 completely on either side, pressure in hydraulic circuits 22, 22' rises to actuate the high speed mold opening and closing pressure switch 23, thereby starting high speed mold opening by the function of a quick feed piston 7 in the same way as the above-mentioned embodiment.

On the other hand, when the hydraulic device 25 is changed over to put the hydraulic cylinders 4 in action, the half-nuts 3 will be closed and connected to the quick feed ram 5 through the medium of the screws a, b as shown in FIG. 8 and the strong mold clamping pressure switch 24 in the hydraulic circuit 22' will be actuated by a rise of pressure, thereby starting strong mold clamping by the function of the mold clamping ram 2.

Since each of the pressure switches 23, 24 is actuated by a rise of pressure in the hydraulic circuits 22, 22' coming about after the half-nuts 3 move to effectuate strong mold clamping and high speed mold opening in accordance with the above-mentioned embodiment, it is apprehended that strong mold clamping and high speed mold opening may be started by a rise of pressure even though the aforementioned screws a, b are in imperfect engagement, but the above-mentioned embodiment has the advantage that the position where the pressure switches 23, 24 are set is not limited to the vicinity of the mold clamping ram 2, but they can be set at an arbitrary position in the mold clamping device.

As this invention is so designed that processes of strong mold clamping and high speed mold opening are effectuated by the movement of the half-nuts for connecting the mold clamping ram and the quick mold feed ram in a body or a rise of pressure resulting from a stop of the half-nuts as mentioned above, the starting of each process is positively related to the movement of the half-nuts, effectuating strong mold clamping and high speed mold opening only under normal condition, whereby damage of the aforementioned rams attributed to abnormal connection or abnormal opening of the half-nuts can be prevented.

I claim:

1. A mold clamping device for injection molding machines having a pair of closable mold halves, comprising:
   A. an open interior mold clamping ram;
   B. a quick feed ram operatively movably inserted through said mold clamping ram;
   C. a pair of opposed threaded half nuts hydraulically movably mounted in said mold clamping ram and extendable into or retractable from the open interior thereof;
   D. a screw thread on the periphery of said quick feed ram of mating configuration with those of said half nuts;
   E. a movable plate and a fixed plate, said mold halves being disposed between said movable and fixed plates;
   F. an outwardly extending peripheral flange on said quick feed ram;
   G. a connecting ring attached to said movable plate including an inwardly extending rim spaced from said movable plate and forming a gap therebetween, said flange being movable in said gap a distance nearly equal to the tooth thickness of the respective screw threads and in a direction whereby the respective screw threads are brought into perfect engagement by inward pressure applied to said half nuts and a component force on the slanting surfaces of the respective screw threads in contact with one another;
   H. said quick feed ram, upon mold closing, being moved with respect to said mold clamping ram and the threads of said half nuts and of said quick feed ram interengaging and inter-connecting said mold clamping and said quick feeding rams, thereby directly pressing said quick feed ram in the direction of a mold by said mold clamping ram.

2. A mold clamping device as claimed in claim 1, including a plurality of mold clamping switches and mold opening switches oppositely mounted on said mold clamping ram and said half nuts, said switches being actuatable by movement of said half nuts for initiating strong mold clamping and high speed mold opening alternately, a hydraulic circuit, said switches being operatively connected in said circuit, said hydraulic circuit operable for the extension and retraction of said half nuts for effectuating mold clamping and mold opening alternately, and initiating strong mold clamping and high speed mold opening alternately through pressure rise in said hydraulic circuits upon terminations of half nut movements.

* * * * *